Aug. 8, 1961   W. J. ROWAN   2,995,041
TRANSMITTING APPARATUS
Filed May 29, 1956

INVENTOR.
WILLIAM J. ROWAN
BY
ATTORNEY.

United States Patent Office 2,995,041
Patented Aug. 8, 1961

2,995,041
TRANSMITTING APPARATUS
William J. Rowan, Havertown, Pa., assignor to Minneapolis-Honeywell Regulator Company, Minneapolis, Minn., a corporation of Delaware
Filed May 29, 1956, Ser. No. 588,110
12 Claims. (Cl. 74—18)

The invention relates to a flexible pressure seal through which a small mechanical motion or a large force may be readily transmitted from the inner to the outer wall portion of a vessel and/or vice versa. The invention has particular utility in transmitting motion from the inner to the outer wall portions of high pressure vessels.

Heretofore, when such vessels contained high pressures, relatively stiff metallic deflecting tubes or other similar means such as torque tubes had to be employed, in lieu of a less flexible, non-metallic, seal to transmit a small motion or large force through the wall of the pressure vessels in order to minimize the tendency for the flexible seals to be blown from their seal position. Because of the inherent stiffness that such deflecting and torque tubes possess, they are not particularly well suited for the transmission through the walls of pressure vessels of forces of very small magnitude.

It is thus one of the prime objects of the present invention to disclose a pressure seal which is adapted to form a flexible wedge between each of two opposing wall portions of a pressure vessel through which a partially rotatable motion or force transmitting member passes, which seals more effectively resist any tendency to be blown from their position in the walls of the vessel.

Still another deficiency present when torque tubes are used to transmit small mechanical motions or large forces from one side of a fluid tight chamber to another, is that a certain percentage of the force being transmitted must be used to overcome the torsional gradient of the tube through which said motion or force is being transmitted. It is therefore still another more specific object of the present invention to disclose a pressure wedging type of elastomer seal which can transmit such small mechanical motions or large forces through a fluid tight chamber with the seal itself offering a significantly smaller torsional gradient that present in the aforementioned prior art torque tube.

Still another more specific object of the invention is to provide a pressure wedging type of elastomer seal between a pivotally mounted force transmitting member and a wall portion of a pressure vessel through which the transmitting member can transmit a rotary motion.

Still another more specific object of the invention is to provide a pressure wedging type of elastomer seal between a pivotally mounted force transmitting member and a wall portion of a pressure vessel through which the transmitting member can transmit deflecting motion.

The various features of novelty which characterize this invention are pointed out with particularity in the claims annexed to and forming a part of this specification. For a better understanding of the invention, however, its advantages and specific objects attained with its use, reference should be had to the accompanying drawings and descriptive matter in which is illustrated and described a preferred embodiment of the invention.

As has heretofore been mentioned, an ideal type of high pressure seal for a member that is transmitting a small motion or large force through the wall of a pressure vessel is a seal that has the least amount of torsional gradient and yet be of such a nature that an increase in pressure of a fluid in such a vessel cannot blow it out of its sealing position.

Figure 1:
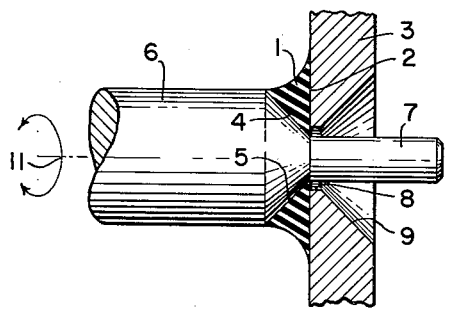
FIG. 1 shows one form of the high pressure wedge shaped seal of the present invention that may be employed to transmit rotary motion through a wall of a pressure vessel.

To this end, there is shown in FIG. 1 a low gradient high pressure seal 1. This wedge-shaped seal 1 is bonded to the inner surface 2 of the wall 3 of a pressure chamber. While, for sake of clarity, the drawing only shows the wedge-shaped seal bonded to an upper and lower portion of the inner wall of the vessel 3, it is to be understood that this wedge-shaped seal in its entirety defines a ring whose entire circumferential surface is bonded to the vessel wall in the manner shown at 2.

Another or inner surface 4 of the ring 1 is shown bonderized in a circumferential manner to a tapered portion 5 of a partially rotatable motion or force transmitting shaft member 6.

This elastomer or seal member 1 may be made of a suitable neoprene or other equivalent elastometric material and its outer non-bonded peripheral surface may be molded to the arcuate shape shown in FIG. 1.

The outer or right end of the shaft 6 has a small diametral portion 7. This right end portion 7 protrudes through and is spaced from an annular opening in the wall 3 of the pressure chamber that has a surface 8 of uniform diameter and a counter sunk surface 9. FIG. 1 also shows at the left end of the motion transmitting member 6, a pair of arrows 11 to indicate the direction of the applied motion or force that is being transmitted through the wall 3 of the vessel by the transmitting member 6.

Figure 2:
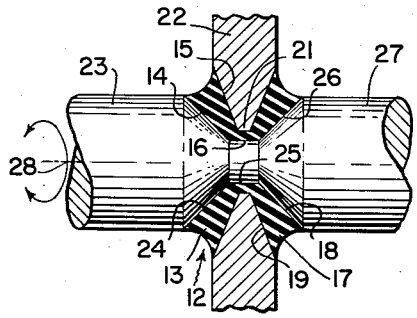
FIG. 2 shows another form of the high pressure wedge shaped seal of the present invention that may be employed to transmit rotary motion through a wall of a pressure vessel.

FIG. 2 shows another type of a wedge-shaped seal 12 which may be used in lieu of the seal shown in FIG. 1. This seal is comprised of three annular portions. The first of these portions consists of a hollow portion 13 having an inner surface 14 and an outer surface 15 which are both of a frustro conical configuration. The second portion of the seal 12 is of cylindrical configuration 16 and the third portion 17 of the seal 12 is similar to the first portion 13 in that its inner and outer surfaces 18 and 19 are of a frustro conical configuration. The outer annular surface of the seal portions 13, 16, and 17 are bonded to an annular V-shaped wall portion 21 and defines an aperture in the wall 22 of a high pressure chamber.

The inner surface of the seal portions 13, 16, and 17 are shown bonderized respectively to a portion 24 of a transmitting shaft 23 that has an annular frustro conical surface, the outer cylindrical surface 25, and to a second frustro conical surface 26. The outer or atmospheric pressure end 27 of the shaft 23 is shown to be of the same diameter as the portion of the shaft that is on the inner or high pressure side of the vessel pressure wall 22. FIG. 2 also shows a pair of arrows 28 to indicate the direction through which the transmitting member 23 may be caused to rotate by a motion or force generating member, not shown. As this member 23 rotates, it transmits this motion or force from a location within the wall of the pressure vessel to a location exterior of the wall.

Figure 3:
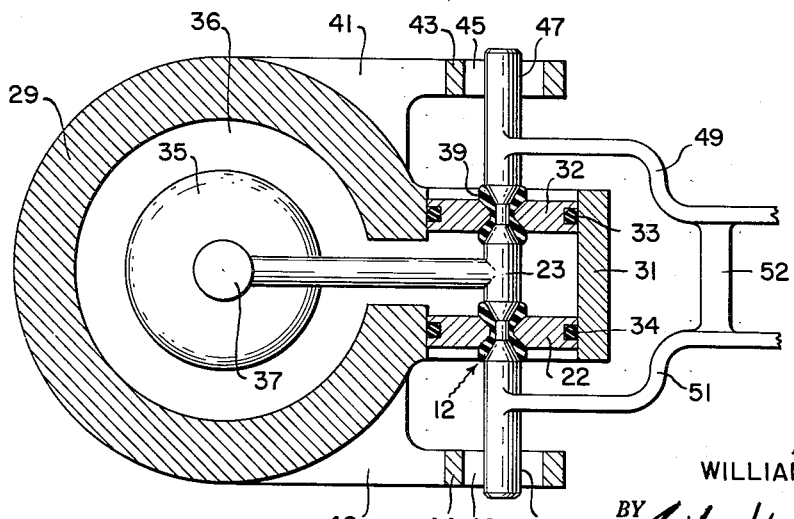
FIG. 3 shows how two seals of the type shown in FIG. 2 may be employed to transmit a rotary motion through two walls of a pressure vessel.

FIG. 3 of the drawing shows how the pressure seal shown in FIG. 2 may be used to seal two opposing wall portions of a pressure vessel in lieu of sealing only one wall portion as shown in FIG. 2.

FIG. 3 shows a housing 29, a housing extension 31, and seal plates 22, 32, all of which define the wall of a high pressure chamber. This FIG. 3 also shows O-rings 33 and 34 which may be used to prevent any of the fluid that is inside the housing 29 from seeping through any opening that may be present between housing portion 31 and the outer peripheral portion of either the seal plates 22, 32, that define a portion of the wall of this high pressure chamber.

Within the housing 29 there is shown a bellows 35. The space between this bellows 35 and the housing 29 is shown containing a fluid 36. Operably connected in any suitable manner for actuation with the top of the bellows 35 there is shown an arm 37, the other end of which is shown integrally connected to the shaft 23. The seal plate or wall portion 22 and the elastomer seal 12 is identical to the plate and seal having these same reference numerals as that shown in FIG. 2. The seal plate or wall 32 and elastomer seal 39 is also of the same type as the seal plate 22 and seal 12 shown in FIG. 2. For convenience of assembly both of these seal plates 22, 32 may be fixedly attached in the position shown by suitable screw means, not shown, to the housing 29. Although not shown, for convenience of assembly each of the portions of the shaft 23 that are adjacent the inner V-shape inner wall portion of each of these seal plates 22, 32, may be made in two pieces and connected together by any suitable internal screw connection.

It should be pointed out, however, that the form of the elastomer seal shown in FIG. 1 could be used equally as well in place of the seals 39 and 12 shown in FIG. 3, and could be more advantageously used if a slightly less torsional gradient type of seal is desired.

FIG. 3 shows two pivot supporting members 41, 42 protruding upwardly from the housing 29. The upper portion of the members 41, 42 contain a hollowed out portion 43, 44. These hollowed out portions 43, 44 act as a support for the pivots 45, 46. These pivots 45, 46 in turn are shown rotatably supporting the shaft 28 at 47 and 48. FIG. 3 also shows a beam member having a right and left leg portion 49, 51 which is integrally connected to the shaft 23 as shown. The outer portions of these leg members are shown connected by means of a cross brace 52.

With the arrangement shown in FIG. 3, the bellows 35 is caused to move in an upward or downward direction depending on whether the pressure of the fluid 36 acting on the bellows is increasing or decreasing. If the pressure of the liquid fill is increasing the bellows 35 will be moved in an upward direction along with the end of the arm 37 connected thereto. Since the other end of the arm 37 is integral with the force transmitting shaft member 23 the shaft member will be partially rotated on its pivots 45, 46 along with the leg and cross brace portions 49, 51, and 52 of the beam member in a clockwise direction as viewed from the right side of FIG. 3. If, on the other hand, the pressure of the fluid 36 is decreasing these leg and cross brace portions 49, 51, and 52 will be partially rotated in the opposite or counterclockwise direction. With these two elastomer seal arrangements 12, 39, an increasing pressure, due to the fluid 36 within the housing and pressure walls 32, 22, will cause a thrust on the elastomers to be increased as is customarily the case. However, with this FIG. 3 arrangement, the elastomer seal 12 will be acted upon by the fluid 36 within the chamber to move the shaft 23 in a left direction and the seal 39 will be acted upon by this same pressure to move the shaft 23 in a right direction. It can thus be seen that a neutralizing or thrust cancelling operation is effected by this FIG. 3 seal arrangement.

It can also be seen that when the pressure of the fluid within the chamber is increased the elastomer material surrounding each of the vessel walls 22, 32 will be prevented from being blown from their positions in the walls of the vessel by the wedging action of the elastomer material that takes place between each of the vessel walls and the portion of the shaft passing therethrough.

The elastomer seal arrangement as shown in FIG. 3, therefore, provides a very efficient yet safe way of transmitting a rotatable motion or force from one side of a pressure chamber to another.

Although not shown in FIG. 3 of the drawing, a balancing system, such as a force balanced system, may be operably connected to the outer portion of the legs of the beam 49, 51 that are adjacent the cross brace 52.

Figure 4:
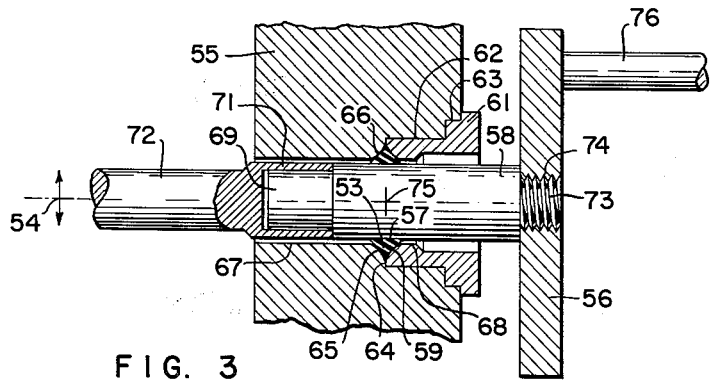
FIG. 4 shows still another form of the high pressure wedge shaped seal of the present invention and how such a seal may be arranged to transmit an up and down motion or a force acting in a vertical plane through the wall of a pressure vessel.

FIG. 4 of the drawings shows how still another wedge seal may be employed in an arrangement in which small, deflecting mechanical motion or a large deflective force may be transmitted through the wall of a pressure vessel. This figure shows how an annular elastomer 53, that is of a substantially equilateral triangular configuration may be employed to transmit either a force or motion acting in the up and down manner as that indicated by the arrow 54 from a high pressure side of a pressure vessel wall 55 to a yoke member 56 located exterior of the vessel wall. This wedge-shaped seal 53 is bonderized at its inner annular surface 57 to the outer peripheral portion of a shaft 58. A portion of one of the sides of the aforementioned triangular seal 53 is also bonderized to a tapered inner end portion 59 of a hollow cylindrical member 61.

The wall 55 contains a portion 62, 63 that forms a cylindrical aperture in its outer surface into which the sleeve member 61 may be inserted. This sleeve member is retained in place by any suitable connecting means such as by a suitable welding material, not shown. The inner portions of this hollow cylindrical sleeve member 61 is shown in surface to surface contact with the portion 64 of the vessel wall 55. The inner diametral surface of the portion 64 of the wall 55 is shown having a curved annular surface 65. This annular surface 65 forms a stationary portion against which the inner or pressure side 66 of the equilateral elastomer 53 may be abutted. The wall surface 67 of the pressure vessel wall 55 and the surface 68 each form annularly shaped openings which are of a larger internal diameter than the motion or force transmitting member 58. The left end 69 of the force transmitting member 58 is shown of a smaller diameter than the central portion of the member 58 and is fixedly connected to the inside of a socket 71 of a force transmitting member 72. The right end 73 of the transmitting member 58 is also shown having a smaller diameter than the central portion of the member 58. This right end portion 73 is connected to the yoke 56 by means of a threaded connection 74.

Although not shown in detail, the yoke 56 is pivotally connected at each of its outer ends to cross spring pivots which are connected to the wall 55 in such a manner that the pivot point about which the yoke member 56 and the member 58 will rotate in an up and down direction will be located at the center of the cross 75 shown in FIG. 4. The yoke 56 may also have connected to its right side a shaft 76 which shaft may be, in turn, used to transmit the up and down motion or deflecting force 54 to a force balance transmitting system, not shown.

As the up and down motion or a deflective force is applied to the left end of the member 58 by the force or motion transmitting beam 72 the equilateral elastomer 53 will be caused to wedge between the tapered portion 59 of the hollow cylindrical member 61 and the curved annular surface 65 of the vessel wall 55. This wedging action will thus prevent the elastomer 53 from being blown from its position shown in FIG. 4 by any increase in the pressure of a fluid inside the vessel wall 55 that is present in the space between the outer diameter of the member 58 and the inner diameter of the wall 55 defined by the surface 67.

It can thus be seen that the seal 59 which, in this FIG. 4 disclosure, may also be made of any suitable material such as neoprene can be used as an efficient low gradient seal and yet at the same time possess the aforementioned anti-blowout characteristic.

Each of the wedge-shaped seals disclosed in the various figures of the drawing not only possess ideal anti-blowout characteristics because of their wedge shape configuration, but also are of such a nature that they will readily permit small mechanical motions or a large force to be transmitted from the inner to the outer wall of a pressure vessel and/or vice versa.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. A flexible seal means for transmitting mechanical motion through a fluid tight wall, comprising a motion transmitting member extending through an opening in said wall, a circumferential portion of said wall defining said opening being of a dull pointed V-shaped configuration, said motion transmitting member having a portion adjacent to, passing through, and protruding slightly beyond said dull pointed portion of said wall of a rod shaped configuration, said member having a tapered portion protruding from each end of said rod portion of a gradually outwardly increasing dimension to a position that is slightly beyond each side of said wall portion defining said opening in said wall and means sealing said portion of said opening between said V-shaped wall portion and said rod and tapered portion of said member which is of a substantially U-shaped cross section.

2. Means for transmitting mechanical motion through a fluid tight wall, comprising, a motion transmitting member extending through an opening in said wall, a portion of said wall defining said opening being of a V-shaped configuration, the outer surface of said portion of said member passing through said opening being substantially of a hyperboloid revolution and spaced from said portion of said V-shaped wall and means sealing said opening between said portion of said member passing through said opening and said V-shaped portion of said wall.

3. Means for transmitting mechanical motion through two fluid tight walls of a pressure vessel, comprising a motion transmitting member extending through an opening in each of the said two walls, a portion of said wall adjacent said opening in each of said walls being of a dull pointed V-shaped configuration, said portions of said motion transmitting member having a portion of rod-shaped configuration adjacent to and protruding slightly beyond each of the dull points of said dull pointed portions of said walls, said member having a tapered portion of gradually outwardly increasing dimension on either side of each of said rod-shaped portions to a position that is slightly beyond each side of its associated wall portion and means sealing each of said portions of said openings between each of said V-shaped wall portions and their associated rod and tapered portions.

4. Means for transmitting mechanical motion through two fluid tight walls, comprising a motion transmitting member extending through an opening in each of said walls, a portion of each of said walls defining said openings being of V-shaped configuration, the outer surface of the portion of said member passing through said openings being substantially of a hyperboloid revolution and spaced from said portion of its associated V-shaped wall, and means sealing said opening between each of said portions of said member passing through said opening and its associated V-shaped portions of said wall.

5. Means for transmitting mechanical motion through two fluid tight walls of a chamber, comprising a motion transmitting member extending through an opening in each of said walls, a portion of said wall adjacent each of said openings being of an inwardly tapered configuration, said motion transmitting member having a cylindrical portion of one diameter within said chamber and a tapered portion of gradually diminishing dimension within and adjacent an inner wall surface of each of the walls of said chamber and a cylindrical portion of a dimension that is less than said first mentioned cylindrical portion protruding from each of said tapered portions through each of the said tapered walls of said chamber and a sealing means between each of said inner wall surfaces, chamber walls and the associated tapered portion of said member.

6. A fluid seal for a pressure responsive apparatus, comprising a fluid tight wall having an opening therethrough, said wall portion defining said opening being of an increasing inside diametral dimension between the inner surface of a central portion of said wall and the outer and inner surface of said wall, a motion transmitting rod passing through and being spaced apart from the opening in said wall, a portion of said rod passing through said opening in said central portion of said wall being spaced at a fixed distance from said central portion and said rod portion passing through said opening between said central portion and said outer wall portion and said rod portion passing through said opening between said central portion and said inner wall portion each being spaced at gradually increasing spaced distances from said wall and a mass of elastomer material between and bonded to said surface of said wall portion forming said opening in said wall and to said portions of said rod passing through said wall openings.

7. A fluid seal for transmitting small degrees of mechanical motion through an opening in a fluid tight wall of a high pressure chamber, comprising a motion transmitting member passing through said opening in said wall of said chamber, a first portion of a unitary hollow elastomer seal having an inner surface of a gradually decreasing frusto-conical configuration, said first portion of said seal being bonderized at its inner surface to a first tapered portion of said member that is passing from the inner to a central portion of said wall, a second portion of said seal having an outer and inner cylindrical portion bonderized at its inner diametral surface to a central portion of said member that is passing through said central portion of said wall, a third portion of said seal having an outer and inner surface of a gradually increasing frusto-conical configuration bonderized at its inner surface to a second tapered portion of said member and said outer surface of said first, second, and third portions being bonderized to said wall portion through which said member passes.

8. An anti-blowout elastomer sealing means for enabling a partial rotary motion to be transmitted through an opening defined by a wall surface of each one of a pair of opposing walls of a pressure chamber, comprising a motion transmitting member passing through said openings in said chamber, means external of said chamber for pivotally and rotatably mounting the longitudinal axis of the member in a position that is equally distant from each of said wall surfaces defining said openings in said wall, a first circumferential elastomer seal positioned between and bonded to the surface, defining an opening in one of said walls and to said portion of said member passing therethrough, a second circumferential elastomer seal positioned between and bonded to the surface defining an opening in the other of said walls and to said portion of said member positioned therebetween, said cross section of each of said seals being of a substantially U-shaped configuration in which said vertical portions of said U are of such a thickness that they form a wedge between each of the outer and inner wall portions of said openings in said walls and the associated member passing therethrough.

9. Means for transmitting mechanical motion by way of a motion transmitting member through an opening in a wall of a hollow cylindrical pressure vessel, comprising an elastomer ring of wedge shaped cross section having one of its surfaces fixedly connected to and spaced circumferentially the inner surface of the wall defining said opening, a fixedly mounted pivot means positioned external but adjacent to said end wall of said vessel, the motion transmitting member having a portion extending through and being sealingly secured circumferentially to the other remaining surface defining the wedge cross section surface of said elastomer ring and said transmitting member being pivotally mounted for arcuate movement on said pivot.

10. In a high pressure seal for use in a wall of a high pressure vessel, a motion transmitting member, a seal of elastomer material sealingly secured circumferentially to a surface defining a substantially V-shaped groove in a peripheral portion of said member at its inner surface and being sealingly secured in a wedging manner to either side and at a tip portion of a dull pointed circumferential surface defining an opening in the wall of the high pressure vessel.

11. A high pressure fluid seal comprising a rod rotatably supported for movement in a pressure vessel, a seal ring of elastomer material in two opposing walls of said vessel, each of said seal rings being sealingly secured to a surface forming a circumferential V-shaped groove in said rod portion that passes through each of said seal rings at their inner diametral surface and being sealingly secured to a tip portion of and being in a wedging manner to either side portion of a dull pointed circumferential surface defining an opening in each wall of said vessel.

12. Means for transmitting motion through an opening in a wall of a pressure vessel, comprising an elastomer having at least one ring portion whose cross section is of a wedge shaped configuration, said ring portion having one of its side surfaces defining said wedge fixedly connected to the inner side wall surface of said wall that surrounds said opening defined in the wall of said pressure vessel and said ring portion having a second side surface fixedly connected to an outer circumferential surface portion of a motion transmitting member that is positioned to extend through said ring portion and wall of said vessel.

References Cited in the file of this patent

UNITED STATES PATENTS

| | | |
|---|---|---|
| 1,929,491 | Greenwald et al. | Oct. 10, 1933 |
| 2,122,839 | Guy | July 5, 1938 |
| 2,422,327 | Winslow | June 17, 1947 |
| 2,532,210 | Wasserlein | Nov. 28, 1950 |
| 2,665,146 | Berg | Jan. 5, 1954 |
| 2,781,665 | Yao | Feb. 19, 1957 |
| 2,785,259 | Haydon | Mar. 12, 1957 |
| 2,814,704 | Bald | Nov. 26, 1957 |
| 2,826,919 | Klinger | Mar. 18, 1958 |

FOREIGN PATENTS

| | | |
|---|---|---|
| 105,488 | Great Britain | Oct. 27, 1938 |
| 411,276 | Great Britain | June 7, 1934 |
| 936,990 | France | Feb. 23, 1948 |